United States Patent [19]

Seifert et al.

[11] 4,166,597

[45] Sep. 4, 1979

[54] STOWABLE AND INFLATABLE VEHICLE

[75] Inventors: Clair F. Seifert, Newport Beach;
Harvey S. Seapy, Manhattan Beach;
Thorvald K. Petersen, Santa Monica,
all of Calif.

[73] Assignee: The United States of America as represented by the Secretary of the Air Force, Washington, D.C.

[21] Appl. No.: 468,702

[22] Filed: May 9, 1974

[51] Int. Cl.² .............................................. B64G 1/00
[52] U.S. Cl. ................................... 244/160; 244/158;
244/163
[58] Field of Search ................ 244/158, 159, 160, 163

[56] References Cited
U.S. PATENT DOCUMENTS

| | | | |
|---|---|---|---|
| 3,220,004 | 11/1965 | Gillespie, Jr. ...................... | 244/158 |
| 3,405,886 | 10/1968 | Gosnell et al. ...................... | 244/158 |

*Primary Examiner*—Charles T. Jordan

*Attorney, Agent, or Firm*—Joseph E. Rusz; Arsen Tashjian

[57] ABSTRACT

A stowable and inflatable vehicle, adapted for use as a decoy space vehicle and as a replica of a relatively hot parent space vehicle. In addition to other components, the inventive decoy and replica vehicle includes: a telescoping central tubular member that provides a rigid support and means for telescoping which aids in stowing the replica inventive vehicle; an inflatable structure which forms an external shape; and, a heater blanket in the outer layers of the structure to simulate the surface temperature of the parent vehicle. As a matter of preference, and in this adaptation, the inventive replica space vehicle is of a conical external configuration. The capability of this inventive vehicle to be inflated to the desired external shape, rather than to assume the external shape by use of solely mechanical expanding means, provides superior structural integrity, and also permits a significant reduction in external dimensions and easy storage, even where stiff materials (which are difficult to fold and to unfold) must be, or preferably are, used.

7 Claims, 3 Drawing Figures

STOWABLE AND INFLATABLE VEHICLE

BACKGROUND OF THE INVENTION

This invention relates generally to a stowable and inflatable vehicle and, more particularly, to an adaptation thereof for use as a decoy space vehicle.

As is well known in the art, stowable vehicles which are mechanically erected, or are otherwise "fully opened" entirely mechanically, have inherent and severe disadvantages. Some of the more serious of these disadvantages and limitations are: inferior structural integrity, particularly in space (i.e., the region beyond the earth's atmosphere); and, where the vehicle is of stiff material (as it must be to withstand travel in certain environments) and the material is to be folded and stowed, experience has proven that the stiff material is difficult to fold, and that it is even more difficult to unfold solely by mechanical means; and, also the use of stiff material has meant to date in the art that a large storage volume is necessary to stow the folded vehicle. We have invented a stowable vehicle which may have stiff material(s) which are to be unfolded, which said vehicle is described herein as adapted for use as a decoy space vehicle, and the structure of which eliminates, or at the very least greatly minimizes, the above-mentioned (and other) severe inherent disadvantages and limitations. Thereby, we have significantly advanced the state-of-the-art.

SUMMARY OF THE INVENTION

This invention pertains to a stowable and inflatable vehicle, as adapted for use as a decoy (i.e., a replica) of a relatively hot parent space vehicle, wherein said parent vehicle and said decoy are intended for use in space (i.e., the region beyond the earth's atmosphere).

The primary object of this invention is to teach a unique stowable and inflatable vehicle.

This object, and other objects (such as adaptation of the generic inventive vehicle to a preferred embodiment useable as the aforedescribed decoy space vehicle) and ones related thereto, of this invention will become readily apparent after a consideration of the description of this invention and reference to the drawings.

DESCRIPTION OF THE PREFERRED EMBODIMENT

Figure 1:
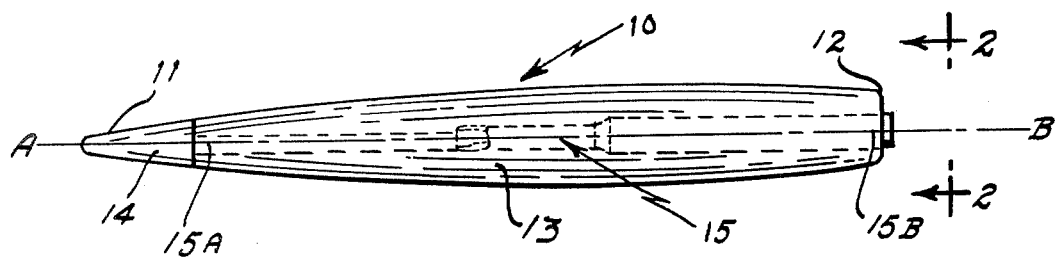
FIG. 1 is a side elevation view, in simplified schematic form, of a preferred embodiment of our unique stowable and inflatable vehicle in its adaptation as a decoy of a relatively hot parent space vehicle, while it is in the stowable deflated mode.

With reference to FIG. 1, therein is shown a preferred embodiment 10 of an adaptation of our invention. More specifically, shown in FIG. 1 is an embodiment 10 of our stowable and inflatable vehicle, as adapted for use as a decoy (i.e., a replica) of a relatively hot parent space vehicle, with said embodiment 10 being shown in the deflated, and stowable, mode.

The embodiment 10 includes, as shown in FIG. 1, a fore end 11, an aft end 12, and a longitudinal axis A–B. Also shown are: an outer covering 13 of the vehicle 10; a rigid nose tip 14 disposed at the fore end 11 of the vehicle 10 and external of, and connected to, the outer covering 13; and, an extendable and collapsable tube, generally designated by reference numeral 15, centrally located within the vehicle 10, in registration with the vehicle's longitudinal axis A–B, and extending from the fore end 11 to the aft end 12 of the vehicle, with the tube having a first end 15A and a second end 15B, wherein the first end 15A interfaces with the rigid nose tip 14.

Figure 2:
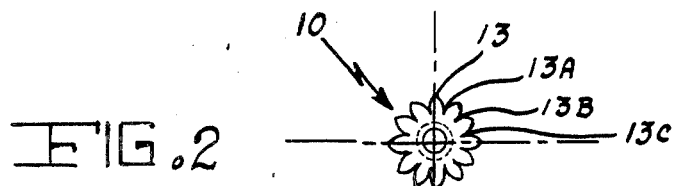
FIG. 2 is an end view of the preferred embodiment of our invention shown in FIG. 1, with the view taken along line 2—2 of FIG. 1.

With reference to FIG. 2, therein is shown an end view of the preferred embodiment 10 shown in FIG. 1, with the view being taken along line 2—2 of said FIG. 1. Since the embodiment 10, as shown in FIG. 1, is in the deflated (and stowable) mode, the folds (such as representative ones 13A, 13B and 13C) of the outer covering 13 of vehicle 10 can be more easily seen and appreciated. Said outer covering 13 is preferably made of woven carbon cloth and also preferably is 30 mils thick. Because of the nature of this material, and also because of the thickness of this material which comprises the outer covering 13, the material is difficult to fold, and is even more difficult to unfold solely by known mechanical means.

Figure 3:
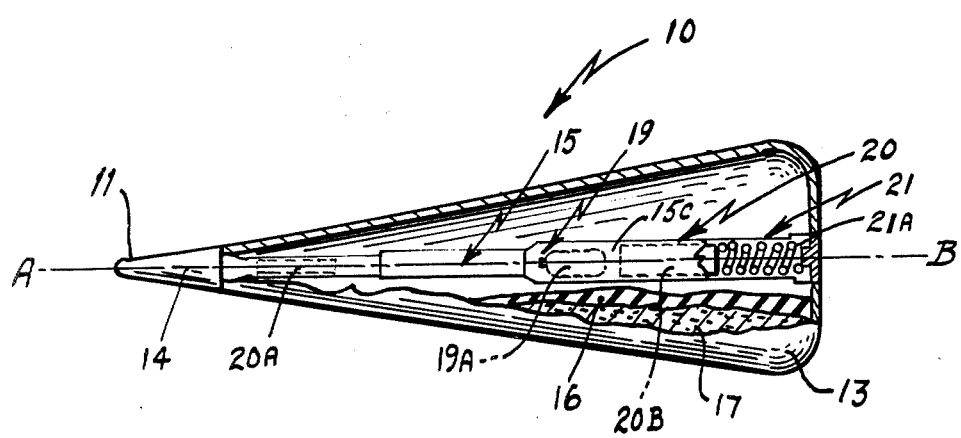
FIG. 3 is a side elevation view, in simplified schematic form and partially fragmented, of the preferred embodiment of our invention shown in FIGS. 1 and 2, when that embodiment is not stowed and is in the inflated mode.

With reference to FIG. 3, therein is shown preferred embodiment 10 in a side elevation view, in simplified schematic form, and partially fragmented. As depicted in FIG. 3, the vehicle 10 is in its inflated mode, and in that mode is not intended to be stowed. Shown in FIG. 3 are the following components of said vehicle 10: the longitudinal axis A–B; the outer covering 13; the rigid nose tip 14 at the fore end 11 of the vehicle 10; an inflatable liner 16, preferably of a 15 mil laminate of "Kapton", a polyimide film, internal of the outer covering 13; a heater blanket 17 interposed between the outer covering 13 and the inflatable liner 16; and, the extendable and collapsable centrally located tube or tubular member 15 in its collapsed (i.e., retracted or contracted or "telescoped") condition. Also shown in FIG. 3, is the fact that tube 15 as a matter of preference has a hollow center, generally designated 15C, which contains: means 19, which need only be internal of outer covering 13, for inflating the inflatable liner 16, and which said inflating means 19 includes an inflatant tank 19A; means 20, which also only need be internal of outer covering 13, for heating the heater blanket 17, and which said heating means 20 includes heater controls 20A and a heater battery 20B; and, means 21, which also only need be internal of outer covering 13, for extending and for collapsing the extendable and collapsable tube 15. Further shown in FIG. 3 is biasing means 21, such as spring 21A, which is internal of outer covering 13 and which is for launching (i.e., ejecting and spinning) the vehicle 10 when inflated. It is to be noted that said launching means are not absolutely necessary and, even if desired, may be external of the vehicle 10 (such as internal of the cameo in which the vehicle 10 is stowed).

MANNER OF OPERATION OF THE PREFERRED EMBODIMENT

The manner of operation of the preferred embodiment 10 of our inventive vehicle is self-evident to a person of ordinary skill in the art, and is also very easily understandable by others, from the foregoing description of the preferred embodiment 10, coupled with reference to the drawings.

Succintly, the preferred embodiment 10 is stowed in the deflated mode, as shown in FIGS. 1 and 2, aboard a suitable carrier, such as a parent space vehicle (not shown) which is relative hot and of which the vehicle 10 is replica. The carrier is launched, or is otherwise deployed into space by suitable means; and, at the appropriate time (e.g., when it is either necessary or desirable to cause confusion as to which is the parent, i.e., the true or actual, space vehicle), the decoy vehicle 10 is deployed from the carrier into space by, for example, launching from the carrier by ejection and with spin. It is here to be noted that during stowage the centrally located tube 15, FIG. 1, is in the extended condition and is releasably locked in that condition by suitable means, such as a spring loaded pyrotechnic pin puller (not shown).

The deployment of the decoy (i.e., the replica) vehicle 10 may be initiated, for example, by electrically firing a pyrotechnic tube cutter (not shown) which in turn severs a tie-down tube (not shown) that holds a compression spring, such as launch spring 21A, FIG. 3, at the base of the replica 10, which said spring provides axial force to eject the replica 10 at the desired velocity. Spin up is also accomplished by this spring, such as 21A, FIG. 3, by hardened pins (not shown) traveling up a spiral in the launch post (not shown).

Concurrently with the above-described action, the centrally located tube 15, FIG. 3, is telescoped by suitable means, such as by the spring loaded pyrotechnic pin puller, mentioned above, which is released by a squib (not shown). Simultaneously, the inflating means 19, FIG. 3, is activated by suitable means, such as pyrotechnically, with the result that pressurized inflatant tank 19A emits the inflatant; the inflatable liner 16, FIG. 3, is inflated; and, thereby, the vehicle 10, as a whole, is inflated and attains the inflated mode or condition, as shown in FIG. 3. It is here to be noted that the external configuration of vehicle 10, when inflated, is conical to "match" or reproduce the configuration of the parent vehicle (not shown).

CONCLUSION

It is abundantly clear from all of the foregoing, and from the drawings herein (i.e., FIGS. 1-3, inclusive), that the stated and desired principal object of our invention has been attained. In addition, other desirable objects (such as the adaptation of the generic inventive vehicle for use as a decoy space vehicle which is a replica of a relatively hot parent space vehicle) have been achieved.

It is to be noted that, although there have been described the fundamental and unique features of our inventive stowable and inflatable vehicle as applied to a particular embodiment (i.e., a decoy and replica space vehicle), various other embodiments, substitutions, additions, omissions, adaptations, and the like, will occur to, and can be made by, those of ordinary skill in the art, without departing from the spirit of our invention.

What is claimed is:

1. A stowable and inflatable decoy space vehicle, having a fore end, an aft end, and a longitudinal axis, adapted for use as a replica of a relatively hot parent space vehicle, comprising:
   a. an outer covering of woven carbon cloth;
   b. a rigid nose tip disposed at the fore end of the decoy space vehicle and external of, and connected to, said outer covering;
   c. an inflatable liner internal of said outer covering;
   d. a heater blanket interposed between said outer covering and said inflatable liner;
   e. an extendable and a collapsable tube centrally located within the decoy space vehicle, in registration with said longitudinal axis of the decoy space vehicle, and extending from said fore end of the decoy space vehicle to said aft end of the decoy space vehicle, with said tube having a first end and a second end, wherein said first end interfaces with said rigid nose tip;
   f. means, internal of said outer covering, for inflating said inflatable liner;
   g. means, internal of said outer covering, for heating said heater blanket;
   h. and, means, internal of said outer covering, for extending and for collapsing said extendable and collapsable tube.

2. A stowable and inflatable decoy space vehicle, as set forth in claim 1, wherein said outer covering is of a thickness of 30 mils.

3. A stowable and inflatable decoy space vehicle, as set forth in claim 1, wherein said inflatable liner is made of suitable material which is of a thickness of 15 mils.

4. A stowable and inflatable decoy space vehicle, as set forth in claim 3, wherein said suitable material is a laminate of a polyimide film.

5. A stowable and inflatable decoy space vehicle, as set forth in claim 1, which further comprises means for launching said vehicle, wherein said launching means is suitably structured to impart a spin to said decoy space vehicle.

6. A stowable and inflatable decoy space vehicle, as set forth in claim 5, wherein said launching means is internal of said outer covering and includes biasing means for imparting a spin to said decoy space vehicle.

7. A stowable and inflatable decoy space vehicle, as set forth in claim 6, wherein said biasing means is a spring.

* * * * *